United States Patent
Yagi

(10) Patent No.: US 9,088,679 B2
(45) Date of Patent: Jul. 21, 2015

(54) IMAGE FORMING APPARATUS, AND CONTROL METHOD AND PROGRAM FOR THE SAME

(75) Inventor: Yuichi Yagi, Machida (JP)

(73) Assignee: CANON KABUSHIKI KAISHA, Tokyo (JP)

(*) Notice: Subject to any disclaimer, the term of this patent is extended or adjusted under 35 U.S.C. 154(b) by 795 days.

(21) Appl. No.: 12/783,821

(22) Filed: May 20, 2010

(65) Prior Publication Data
US 2010/0321729 A1 Dec. 23, 2010

(30) Foreign Application Priority Data

Jun. 23, 2009 (JP) ................................ 2009-149182

(51) Int. Cl.
G06F 3/12 (2006.01)
H04N 1/00 (2006.01)
H04N 1/04 (2006.01)

(52) U.S. Cl.
CPC ........... *H04N 1/0057* (2013.01); *H04N 1/0062* (2013.01); *H04N 1/00588* (2013.01); *H04N 1/00644* (2013.01); *H04N 1/00663* (2013.01); *H04N 1/00681* (2013.01); *H04N 1/00689* (2013.01); *H04N 1/00694* (2013.01);
(Continued)

(58) Field of Classification Search
CPC ............ H04N 1/0057; H04N 1/00588; H04N 1/0062; H04N 1/00644; H04N 1/00663; H04N 1/00681; H04N 1/00689; H04N 1/00694; H04N 1/00771; H04N 1/00777; H04N 1/00795; H04N 1/00824; H04N 2201/0094

USPC ............... 358/1.1, 1.9, 1.11, 1.12, 1.13, 1.14, 358/1.15, 1.16, 1.17, 1.18
See application file for complete search history.

(56) References Cited

U.S. PATENT DOCUMENTS 6,961,153 B1 * 11/2005 Hidaka ......................... 358/468
2004/0100660 A1 5/2004 Yoshioka et al.
(Continued)

FOREIGN PATENT DOCUMENTS

JP 11-212403 A 8/1999
JP 2000-181638 A 6/2000
(Continued)

OTHER PUBLICATIONS

Office Action mailed Jul. 12, 2013, in Japanese Patent Application No. 2009-149182, Japanese Patent Office.

*Primary Examiner* — Thierry L Pham
(74) *Attorney, Agent, or Firm* — Fitzpatrick, Cella, Harper & Scinto

(57) ABSTRACT

The present invention provides an image forming apparatus and its control method that can suitably control processing of originals in a number larger than the maximum placeable number, while suppressing an increase in the cost and complexity of the control. To accomplish this, the image forming apparatus includes an ADF that conveys a plurality of originals sheet by sheet, and stops reading of the originals when the number of originals that have been conveyed reaches a predetermined number. Moreover, when the number of originals that have been conveyed reaches a predetermined number, in a case where a currently performed job is a first type of job, the image forming apparatus performs processing of read originals, and, in a case where a currently performed job is a second type of job, the image forming apparatus waits without performing processing of read originals.

21 Claims, 6 Drawing Sheets

(52) U.S. Cl.
CPC ....... *H04N1/00771* (2013.01); *H04N 1/00777* (2013.01); *H04N 1/00795* (2013.01); *H04N 1/00824* (2013.01); *H04N 2201/0094* (2013.01)

(56) References Cited

U.S. PATENT DOCUMENTS

| | | | |
|---|---|---|---|
| 2006/0012837 A1* | 1/2006 | Ishikawa | 358/474 |
| 2007/0052999 A1 | 3/2007 | Nakade | |
| 2008/0297821 A1* | 12/2008 | Shibao | 358/1.9 |

FOREIGN PATENT DOCUMENTS

| | | |
|---|---|---|
| JP | 2003-021990 A | 1/2003 |
| JP | 2004-104486 A | 4/2004 |
| JP | 2004-179713 A | 6/2004 |
| JP | 2006-074596 A | 3/2006 |
| JP | 2007-018123 A | 1/2007 |

* cited by examiner

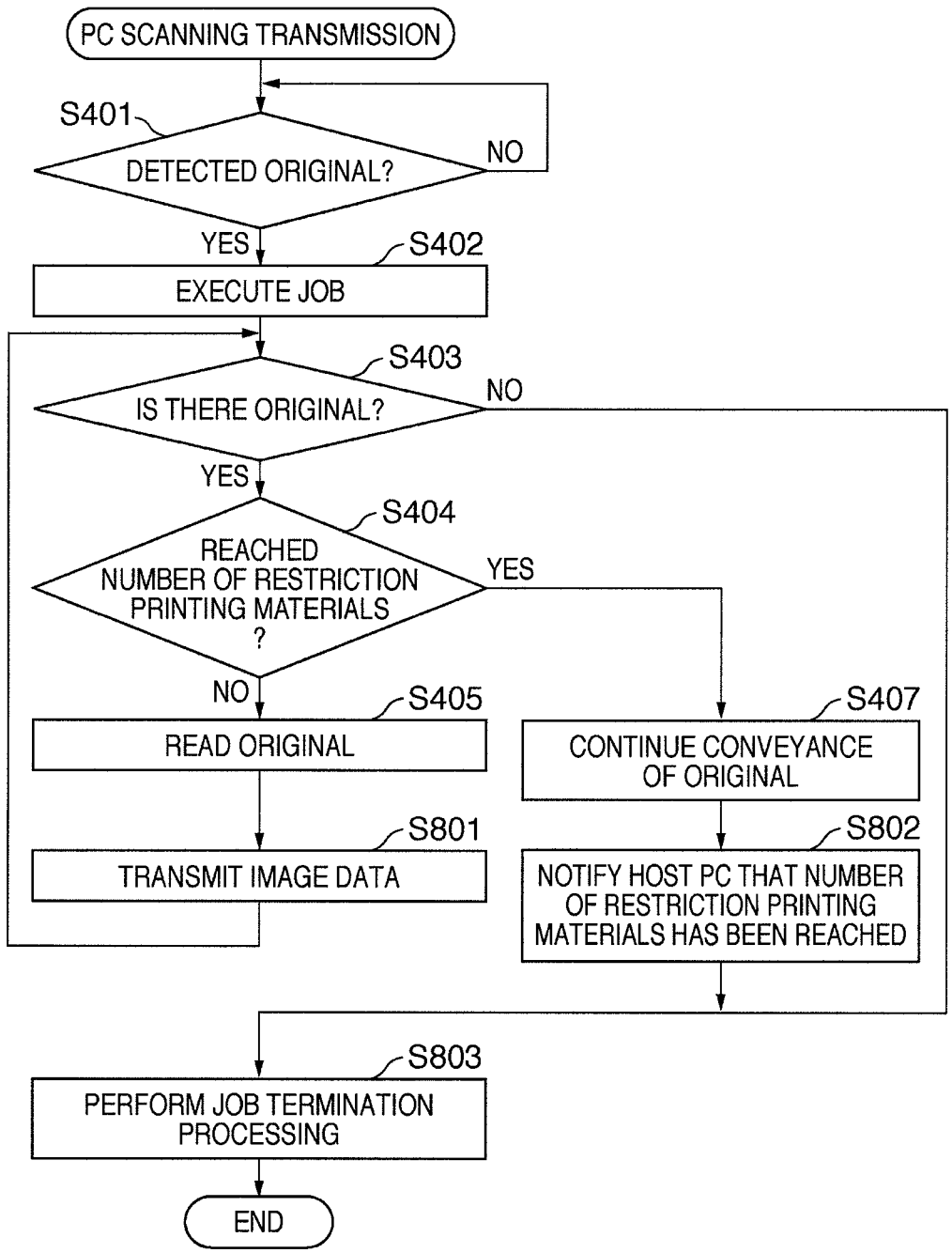

IMAGE FORMING APPARATUS, AND CONTROL METHOD AND PROGRAM FOR THE SAME

BACKGROUND OF THE INVENTION

1. Field of the Invention

The present invention relates to an image forming apparatus provided with an automatic document feeder, and a control method and a program for the same.

2. Description of the Related Art

On image forming apparatus such as multifunction peripherals, facsimile apparatus, and the like, an automatic document feeder (ADF) may be mounted in which, once reading is started, proper termination cannot be performed until all originals placed therein are discharged. In an ADF having this sort of configuration, if originals are added after reading is started, and a number larger than the maximum placeable number of originals are attempted to be read, paper jams, ADF malfunctions, and deterioration of image quality may occur. In order to solve these problems, Japanese Patent Laid-Open No. 2004-104486 proposes a copying apparatus, including a CCD, a sensor that detects whether or not there is an original in an ADF, a counter that counts the number of originals that have been fed, and a sensor that detects the temperature near the CCD, in which the time to perform density calibration is determined. Accordingly, the copying apparatus described in Japanese Patent Laid-Open No. 2004-104486 reduces deterioration of the quality of read images when originals are successively fed.

However, with the above-described conventional technique, a sensor that detects the temperature near the CCD is necessary, and thus, the cost is increased by providing the sensor. Furthermore, in the case where the maximum placeable number is exceeded, complicated control is necessary to perform density calibration again while controlling jobs such as copying, facsimile transmission, or the like. That is to say, there are problems that the cost for components is increased and that the control is complicated, in the case where originals in a number larger than the maximum placeable number are processed while avoiding paper jams, ADF malfunctions, and deterioration of the image quality.

SUMMARY OF THE INVENTION

The present invention enables realization of an image forming apparatus and its control method that can suitably control processing of originals in a number larger than the maximum placeable number, while suppressing an increase in the cost and complexity of the control.

One aspect of the present invention provides an image forming apparatus, comprising: a conveying unit that conveys a plurality of originals placed on an original platen sheet by sheet; a reading unit that reads the originals conveyed by the conveying unit; a counting unit that counts the number of originals that have been conveyed by the conveying unit; a stopping unit that stops the reading by the reading unit, when the number of originals that have been counted reaches a predetermined number; and a control unit that performs processing for the predetermined number of read originals in a case where a currently performed job is a first type of job, and waits without performing processing for the predetermined number of read originals in a case where a currently performed job is a second type of job.

Another aspect of the present invention provides a method for controlling an image forming apparatus, comprising: conveying a plurality of originals placed on an original platen sheet by sheet using a conveying unit; reading the conveyed originals using a reading unit; counting the number of originals that have been conveyed using a counting unit; stopping the reading using a control changing unit, when the number of originals that have been counted reaches a predetermined number; and performing processing for the predetermined number of read originals in a case where a currently performed job is a first type of job, and waits without performing processing for the predetermined number of read originals in a case where a currently performed job is a second type of job.

Still another aspect of the present invention provides a computer-readable storage medium storing a computer program for causing a computer to execute the method for controlling the image forming apparatus.

Further features of the present invention will be apparent from the following description of exemplary embodiments with reference to the attached drawings.

BRIEF DESCRIPTION OF THE DRAWINGS

FIG. 8 is a flowchart showing the processing procedure of PC scanning transmission control according to this embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Forming Apparatus

Hereinafter, an embodiment of the present invention will be described with reference to FIGS. 1 to 8. First, an example of the configuration of an image forming apparatus in this embodiment will be described with reference to FIG. 1. Here, a multifunction printer (hereinafter, referred to as an "MFP") will be described as an example of the image forming apparatus. However, the present invention can be applied to any apparatus as long as it is an image forming apparatus provided with an automatic document feeder (ADF), such as a facsimile apparatus, a scanner apparatus, and the like. Here, the printing method of the MFP is not limited to an electrophotographic method of a laser beam printer or the like, and other printing methods may be applied to the MFP.

Figure 1:
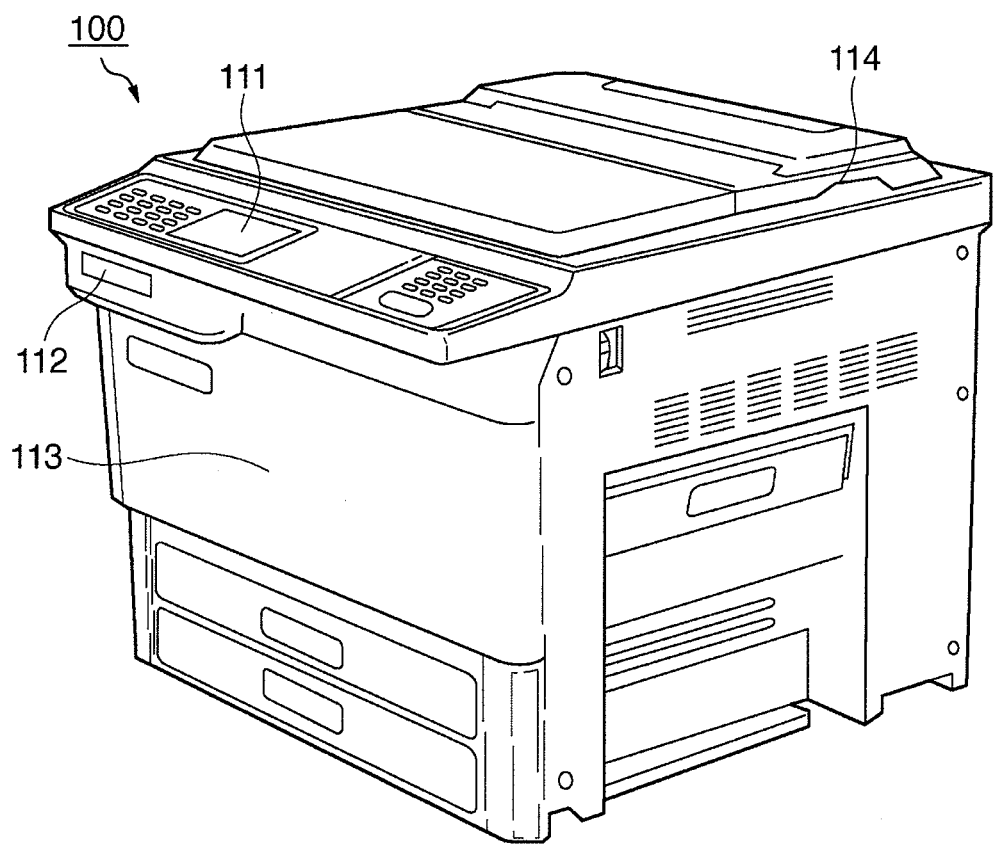
FIG. 1 is a perspective view showing an example of the configuration of an image forming apparatus according to this embodiment.

An MFP 100 as shown in FIG. 1 includes a removable media I/F (interface) 112, an operation unit 111, a printing unit 113, and a scanner unit 114. The removable media I/F 112 may be a USB slot or a card reader unit. When a removable medium such as a USB memory or the like is connected to the removable media I/F 112, stored information can be mutually exchanged between the external storage apparatus and the MFP 100. The operation unit 111 has an operation unit that receives input of data from a user, such as various instructions, letters, numerals, and the like, and a display unit (such as a liquid crystal display or the like) that displays an instruction menu for a user, information on an acquired image, and the like. The scanner unit 114 optically reads an original to obtain image data. The printing unit 113 prints an image on a printing material based on the image data.

Figure 2:
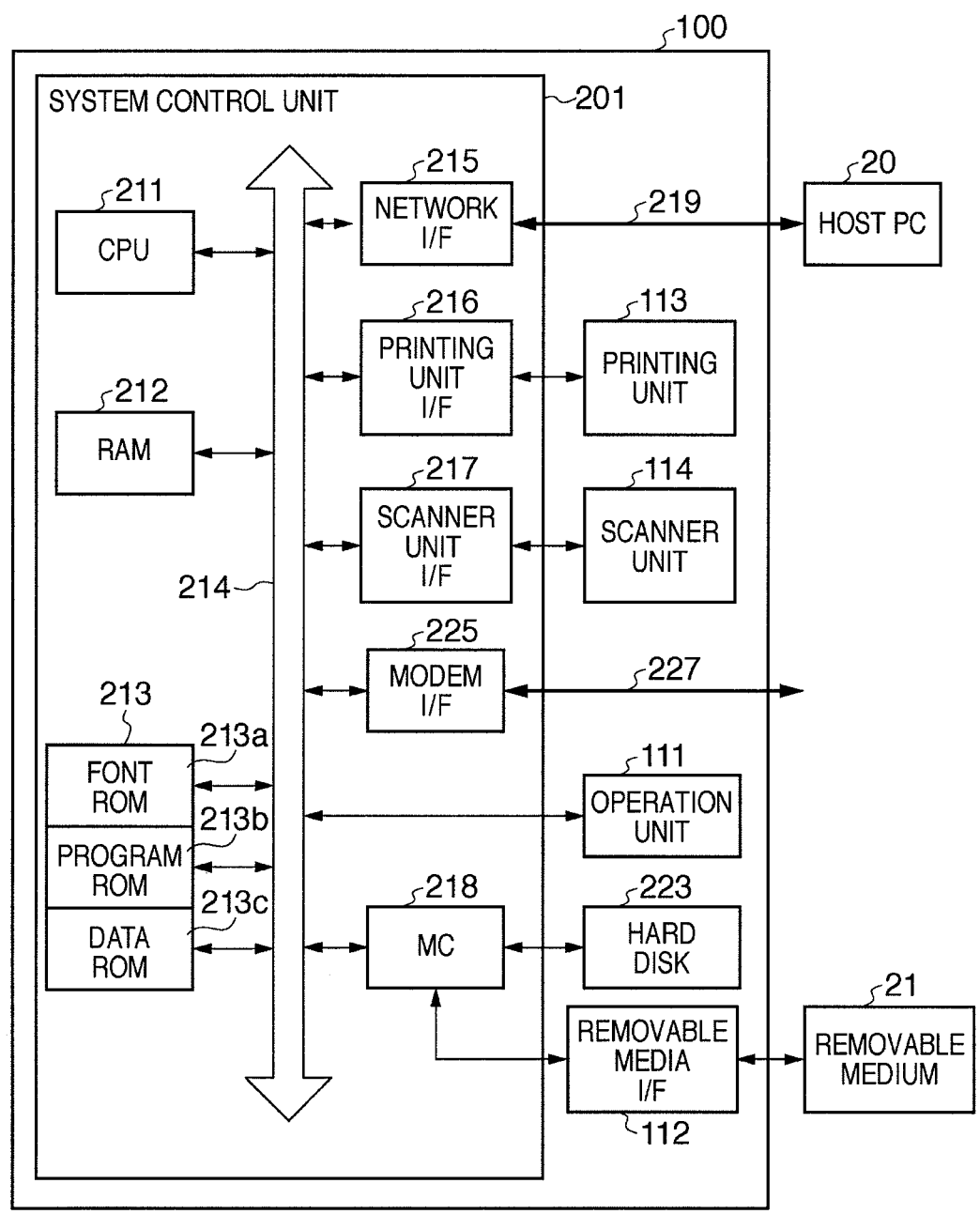
FIG. 2 is a block diagram showing the hardware configuration of the image forming apparatus according to this embodiment.

Next, the hardware configuration of the MFP 100 in this embodiment will be described with reference to FIG. 2. The MFP 100 includes a system control unit 201, the printing unit 113, the scanner unit 114, the operation unit 111, a hard disk 223, and a removable media I/F 112. Furthermore, the system control unit 201 includes a CPU 211, a RAM 212, a ROM 213, a network I/F 215, a printing unit I/F 216, a scanner unit I/F 217, an MC (memory controller) 218, and a modem I/F 225. These components in the system control unit 201 are connected such that data can be mutually exchanged via a system bus 214. Furthermore, memory areas of a font ROM 213a, a program ROM 213b, and a data ROM 213c are allocated to the ROM 213.

The CPU 211 performs processing based on control programs stored in the area of the program ROM 213b, control programs stored in the hard disk 223, or the like, and performs overall control of access to/from various devices. Furthermore, the program ROM 213b may store control programs and the like of the CPU 211 as shown in the flowcharts described later. The font ROM 213a stores font data and the like used when generating output information from the scanner unit 114. The data ROM 213c stores, for example, information and the like used on a host PC 20 in the case of a printer not including the hard disk 223.

The printing unit I/F 216 is connected to the printing unit 113, and outputs an image signal as output information. The scanner unit I/F 217 is connected to the scanner unit 114, and processes input information from the scanner unit 114. The network I/F 215 can communicate with the host PC 20 via a network communication channel 219, and gives information and the like in the printer to the host PC 20. Furthermore, since the network I/F 215 is connected to the network communication channel 219, it can access the Internet. Furthermore, the CPU 211 is connected via the modem I/F 225 to a public line 227, and inputs and outputs data via the public line 227.

The RAM 212 functions as a main memory, a work area, and the like of the CPU 211, and its memory capacity can be expanded by an optional RAM connected to an expansion port (not shown). Here, the RAM 212 is used as an output information expansion area, an environment data storage area, an NVRAM, and the like. Access to/from the hard disk 223 is controlled by the MC 218. Furthermore, the hard disk 223 is optionally connected, and stores font data, emulation programs, form data, and the like. Furthermore, one or more removable media 21 may be provided. For example, in addition to built-in fonts, optional font cards and a plurality of external memories storing programs for interpreting different printer control languages may be connected.

The operation unit 111 is provided with operation switches, LED display units, and the like. Moreover, the operation unit 111 may be provided with an NVRAM (not shown) that stores printer mode setting information that is input by an operator. The scanner unit 114 reads an original or the like, and outputs image data via the scanner unit I/F 217. The network communication channel 219 is configured such that communication with the host PC 20 is possible according to a predetermined protocol.

The removable media I/F 112 functions as a USB slot or a card reader unit. The removable media I/F 112 is provided with a detection unit that detects whether or not the removable medium 21, such as a USB memory or a memory card storing information (for example, image data) stored in an external storage apparatus, has been inserted. Moreover, in the case where the detection unit detects that the removable medium 21 is inserted, the removable media I/F 112 notifies the CPU 211 to that effect. The CPU 211 that has received this notification controls functions that use the removable medium 21. For example, the CPU 211 performs control such that a function of reading image data from the removable medium 21 and printing it with the printing unit 113, a function of saving information from the scanner unit 114 in the removable medium 21, or the like is displayed on the operation unit 111. Here, a memory slot corresponding to a plurality of so-called standardized media constitutes the card reader unit in the removable media I/F 112. Accordingly, the card reader unit also may be configured such that it can read image data from memories in forms other than that of memory cards. Here, the information stored in the removable medium 21 is, for example, a data file created by a user executing an application installed on the host computer. For example, the data file includes various types of data, such as image data, graphic data, text data, and combinations thereof, and imaging data taken with a digital camera.

Configuration and Reading Operation of Scanner Unit

Figure 3:
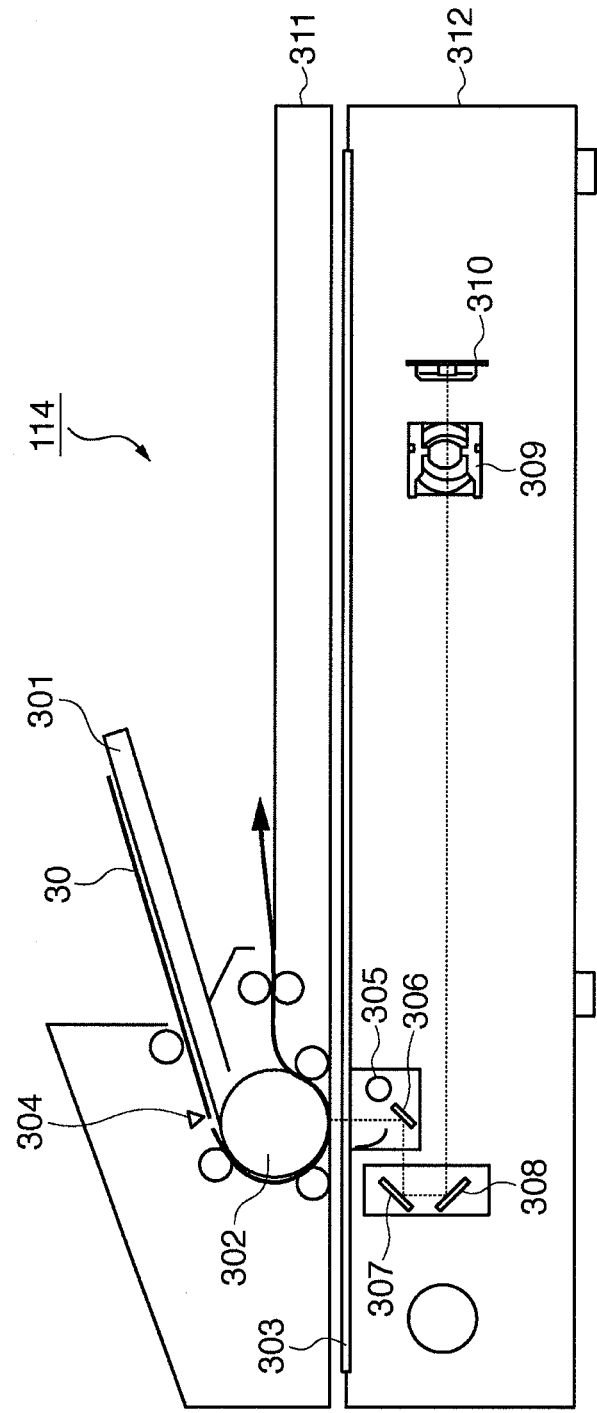
FIG. 3 is a view showing the main configuration and the reading operation of a scanner unit according to this embodiment.

Next, the main configuration and the reading operation of the scanner unit 114 in this embodiment will be described with reference to FIG. 3. The scanner unit 114 is provided with an automatic document feeder (ADF) 311 and a reading unit 312. The ADF 311 is provided with a tray (original platen) 301, a driving roller 302, and a sensor 304. The reading unit 312 is provided with an original platen glass 303, an illumination lamp 305, mirrors 306, 307, and 308, a lens 309, and a CCD sensor 310.

An original 30 that is to be read is placed on the tray 301. The original 30 is conveyed by the driving roller 302 at a constant speed from the tray 301 via a face of the original platen glass 303 in the direction indicated by the arrow in FIG. 3. Furthermore, the sensor 304 detects whether or not an original 30 that is to be conveyed is placed on the tray 301.

The original 30 that is being conveyed by the driving roller 302 is illuminated by the illumination lamp 305, and the reflected light proceeds via the mirrors 306, 307, and 308 to the lens 309 to form an image on the CCD sensor 310. The reflected light input to the CCD sensor 310 is converted by the CCD sensor 310 into electrical signals, then converted by an A/D converter (not shown) into digital data, and input as pixel signals via the scanner unit I/F 217 to the system control unit 201.

In the conveying operation of conveying a plurality of originals 30 in this embodiment, after a first original 30 passes through the sensor 304, conveyance of a next original 30 is started. Accordingly, when a first original 30 is discharged, a second original 30 is conveyed up to the position of the illumination lamp 305. Furthermore, the ADF 311 according to this embodiment conveys originals placed on the tray 301 sheet by sheet, and, once conveyance of the originals 30 is started, conveys all of the originals 30 placed on the tray 301. An ADF 311 having this sort of configuration is inexpensive, and effective for reducing the cost. It is assumed that the image forming apparatus according to this embodiment is provided with this sort of ADF 311.

Copy Control

Next, the copy control in this embodiment using the ADF shown in FIG. 3 will be described with reference to FIG. 4. Here, it is assumed that originals in a number larger than the maximum placeable number are placed on the ADF. The processing described below is realized by the CPU 211 loading a control program stored in the ROM 213 or the hard disk 223 into the RAM 212 and executing the program. That is to say, the CPU 211 controls the scanner unit 114 and the printing unit 113 by executing the control program, and thus realizes the copy control. Here, numbers after "S" shown below indicate respective step numbers in the flowchart.

First, in S401, the CPU 211 uses the sensor 304 to determine whether or not an original is placed on the tray 301. This determination is periodically repeated, and, if an original is placed, the procedure advances to S402. Next, in S402, the CPU 211 waits for a copy instruction from a user, and, if the instruction is given, starts execution of the job, and the procedure advances to S403. Here, "job" refers to processing that performs a function of the MFP 100, such as copying, facsimile transmission, PC scanning transmission, and the like. The job is a copying job in the flowchart in FIG. 4, is a facsimile transmission job in the flowchart in FIG. 6 described later, and is a PC scanning transmission job in the flowchart in FIG. 8 described later.

In S403, the CPU 211 determines whether or not an original is placed on the tray 301. Here, if no original is placed, the processing is terminated, and, if an original is placed, the procedure advances to S404. More specifically, the CPU 211 refers to output from the sensor 304 to determine whether or not an original is placed on the tray 301. If an original is placed, in S404, the CPU 211 determines whether or not the number of originals that have been read after the copying operation was started has reached the sheet limit number. If the sheet limit number has not been reached, the procedure advances to S405, and, if the sheet limit number has been reached, the procedure advances to S407. Here, "sheet limit number" refers to a predefined number of sheets that can be successively processed in the MFP 100. When the sheet limit number is exceeded, paper jams, ADF malfunctions, deterioration of the image quality, and the like may occur.

If the sheet limit number has not been reached, in S405, the CPU 211 controls the scanner unit 114 to read an original. Next, in S406, the CPU 211 transmits image data to the printing unit 113 to start printing, and the procedure returns to S403. On the other hand, if the sheet limit number has been reached, in S407, the CPU 211 gives the scanner unit 114 an instruction to perform only conveyance of originals placed on the tray 301, and terminates the processing after conveyance of all originals is completed. That is to say, in S407, the conveyance of originals is continued, but reading of the originals and printing of the read image data are stopped, and the processing of the copying job is interrupted.

Figure 4:
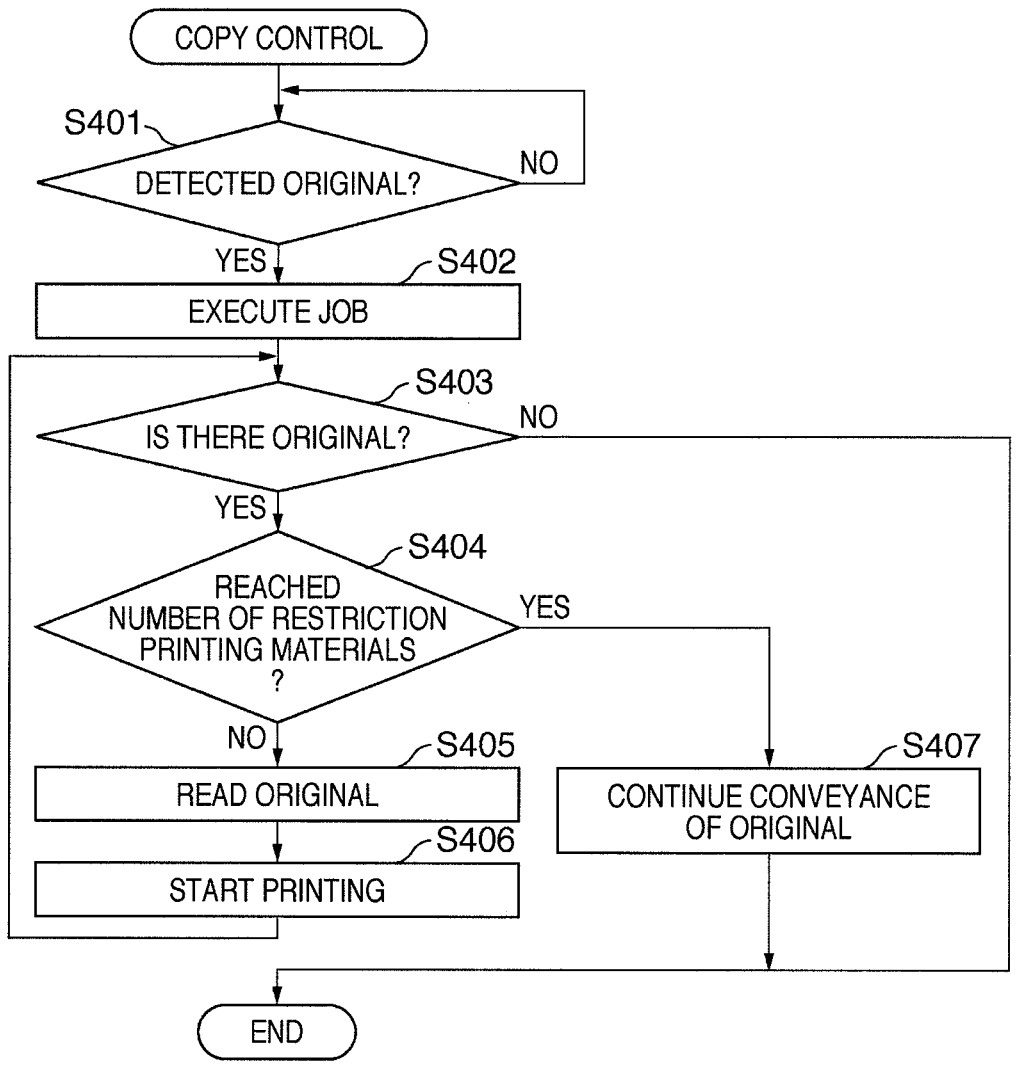
FIG. 4 is a flowchart showing the processing procedure of copy control according to this embodiment.
Figure 5:
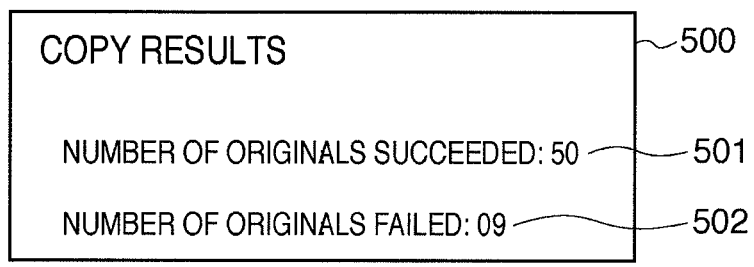
FIG. 5 is a view showing an example of a display screen 500 displayed on an operation unit 111 after a copying operation according to this embodiment is terminated.

Furthermore, although not shown in the flowchart in FIG. 4, the CPU 211 may count the total number of originals and the number of originals that have been copied, and may display the result on the operation unit 111 as shown in FIG. 5. A display screen 500 of FIG. 5 is an example of a screen that is displayed on the operation unit 111 after the copying operation is terminated in the case where originals in a number larger than the maximum placeable number are placed in the flowchart in FIG. 4. 501 denotes the number of originals whose copying operation has been properly terminated, and 502 denotes the number of originals whose copying operation has not been performed.

In this manner, in the image forming apparatus according to this embodiment, in the case where the number of originals that have been conveyed by the ADF 311 in a single job exceeds the predetermined maximum placeable number (the sheet limit number), reading by the reading unit 312 is stooped. Moreover, the image forming apparatus changes control of the currently performed job according to the contents of the job. The flowchart in FIG. 4 is described using, as an example, a copying job of reading image data from an original using the scanner unit 114 and printing the data using the printing unit 113, but, in the case where the job is another job, the control is changed according to the contents thereof. Accordingly, the CPU 211 that performs the processing in the flowchart functions as a control changing unit. Hereinafter, examples of a facsimile transmission job that is a batch transmission job, and a PC scanning transmission job that is an individual transmission job will be described.

Facsimile Transmission Control

Next, the facsimile transmission control in this embodiment using the ADF shown in FIG. 3 will be described with reference to FIG. 6. The facsimile transmission job described in this example is a batch transmission job in which, after reading of all originals placed on the tray 301 is completed, image data accumulated in the RAM 212, the hard disk 223, or the like is transmitted by the modem I/F 225 to an external apparatus. Here, it is assumed that originals in a number larger than the maximum placeable number are placed on the ADF. The processing described below is realized by the CPU 211 loading a control program stored in the ROM 213 or the hard disk 223 into the RAM 212 and executing the program. That is to say, the CPU 211 controls the scanner unit 114 by executing the control program, and thus realizes the control of transmitting image data using the modem I/F 225. Here, steps of performing processing as in the flowchart in FIG. 4 are denoted by the same step numbers, and their further description is omitted.

After an original is read by the scanner unit 114 in S405, in S601, the CPU 211 saves image data in the RAM 212, and the procedure returns to S403. Furthermore, if it is determined in S403 that no original is placed on the tray 301, in S602, the CPU 211 transmits image data saved in the RAM 212 in S601 if any, and terminates the processing. Furthermore, if it is determined in S404 that the sheet limit number is reached, in S407, the CPU 211 gives the scanner unit 114 an instruction to perform only conveyance of originals placed on the tray 301. Subsequently, if conveyance of all originals is completed, the procedure advances to S603 where the CPU 211 displays on the operation unit 111 a display screen (not shown) indicating that transmission of image data cannot be performed because the number of originals exceeds the maximum accumulatable number, interrupts the facsimile transmission job, and terminates the processing.

Figure 6:
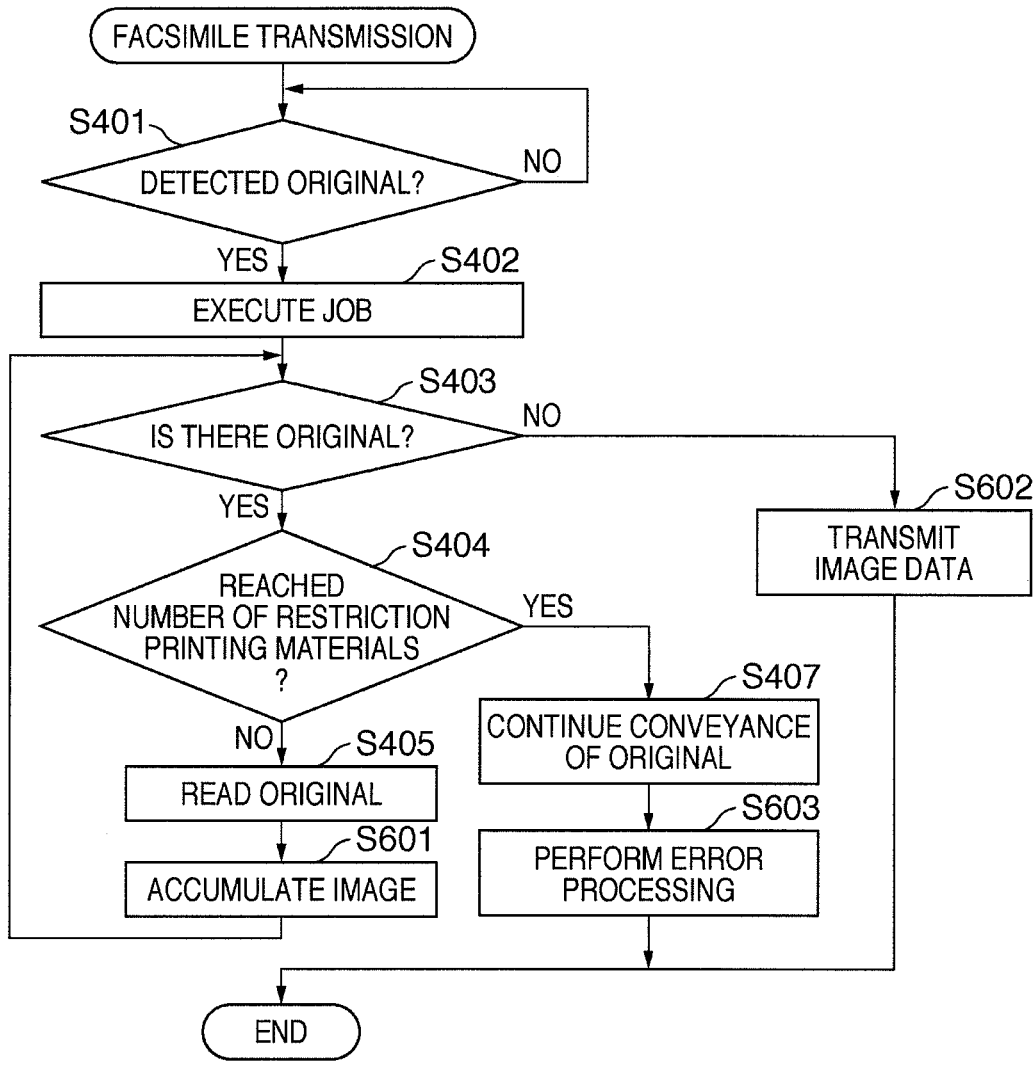
FIG. 6 is a flowchart showing the processing procedure of facsimile transmission control according to this embodiment.
Figure 7:
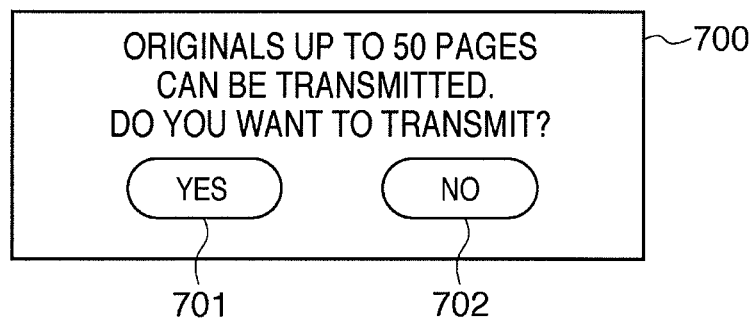
FIG. 7 is a view showing an example of a selection screen 700 displayed when selecting whether or not to perform facsimile transmission according to this embodiment.

Furthermore, although not shown in the flowchart in FIG. 6, after S407, the CPU 211 may display on the operation unit 111 a selection screen 700 on which the number of originals that can be transmitted is displayed and an operator can select whether or not to start facsimile transmission as shown in FIG. 7. In this case, if the operator selects facsimile transmission, processing as in S602 is performed, and, if the operator does not select facsimile transmission, the processing in S603 is performed. On the selection screen 700 as shown in FIG. 7, if a button 701 is selected, facsimile transmission is performed, and, if a button 702 is selected, facsimile transmission is not performed.

PC Scanning Transmission Control

Next, the PC scanning transmission control in this embodiment using the ADF shown in FIG. 3 will be described with reference to FIG. 8. The PC scanning transmission job in this example is an individual transmission job in which each time image data is read from an original by the scanner unit 114, the image data is transmitted to an external apparatus such as the host PC 20. Here, it is assumed that originals in a number larger than the maximum placeable number are placed on the ADF. The processing described below is realized by the CPU 211 loading a control program stored in the ROM 213 or the hard disk 223 into the RAM 212 and executing the program. That is to say, the CPU 211 controls the scanner unit 114 by executing the control program, and thus realizes the control of transmitting image data to the host PC 20 using the network I/F 215. Here, steps of performing processing as in the flowchart in FIG. 4 are denoted by the same step numbers, and their further description is omitted.

After an original is read by the scanner unit 114 in S405, in S801, the CPU 211 transmits image data to the host PC 20, and the procedure returns to S403. Furthermore, if it is determined in S404 that the sheet limit number is reached, in S407, the CPU 211 gives the scanner unit 114 an instruction to perform only conveyance of originals placed on the tray 301. Subsequently, if conveyance of all originals is completed, the procedure advances to S802 where the CPU 211 notifies the host PC 20 that the number of originals has reached the maximum placeable number, and the procedure advances to S803. Furthermore, if it is determined in S403 that no original is placed on the tray 301, the CPU 211 causes the procedure to advance to S803. In S803, the CPU 211 performs termination processing of the PC scanning transmission job, and terminates the processing. Here, in the PC scanning transmission control, also in the case where communication with the host PC 20 is performed using a USB (universal serial bus), the present invention can be applied.

As described above, the image forming apparatus according to this embodiment includes an ADF that conveys all originals placed on the tray once conveyance of originals that are to be read is started, and stops reading of the originals if the number of originals that have been conveyed reaches a predetermined number. Moreover, in the case where the currently performed job is a copying job, the image forming apparatus interrupts the copying job if the printing of the read image data is terminated. In this case, when interrupting the copying job, the image forming apparatus may display on the display unit the number of printing materials on which printing has been properly performed and the number of printing materials on which printing has not been performed. Furthermore, in the case where the currently performed job is a batch transmission job, the image forming apparatus interrupts the batch transmission job without transmitting image data accumulated by that point of time to an external apparatus. In this case, before interrupting the batch transmission job, the image forming apparatus may allow an operator to select whether or not to transmit the image data accumulated by that point of time to an external apparatus. Furthermore, in the case where the currently performed job is an individual transmission job, if transmission of read image data is terminated, the image forming apparatus notifies a destination external apparatus that the job is to be interrupted, and then interrupts the individual transmission job. In this manner, the image forming apparatus changes control of the currently performed job according to the contents of the job, if the number of originals that have been conveyed reaches a predetermined number. Accordingly, it is possible to realize an image forming apparatus that is configured from an inexpensive ADF, that can suitably control processing of originals in a number larger than the maximum placeable number without requiring complicated control, and that can suppress paper jams, ADF malfunctions, and deterioration of the image quality.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149182 filed on Jun. 23, 2009, which is hereby incorporated by reference herein in its entirety.

What is claimed is:

1. An image forming apparatus comprising:
    a reading unit configured to read an original;
    a conveying unit configured to convey an original placed on a tray to a reading position of the reading unit and to discharge the original conveyed to the reading position, wherein a plurality of originals placed on the tray are successively, one by one, conveyed and discharged by the conveying unit; and
    a control unit configured to control the reading unit such that:
        (i) the reading unit reads the conveyed originals from a first original to an Nth original of the plurality of originals placed on the tray, where N is a predetermined number, and
        (ii) the reading unit does not read the conveyed originals from the (N+1)th original to the last original of the plurality of originals placed on the tray.

2. The image forming apparatus according to claim 1, further comprising:
    an image forming unit configured to form an image on a printing material,
    wherein the control unit is further configured to control the image forming unit to form images on printing materials using image data read from the first original to the Nth original.

3. The image forming apparatus according to claim 2, wherein the control unit is further configured to cause a display unit to display information indicating that there is an original which the reading unit has not read.

4. The image forming apparatus according to claim 1, further comprising:
    a storage unit configured to store image data of the at least one original read by the reading unit,
    wherein the control unit is further configured to control the storage unit to store image data of the first original to the Nth original.

5. A method for controlling an image forming apparatus comprising a conveying unit and a reading unit, the method comprising:

conveying, using the conveying unit a plurality of originals an original placed on a tray to a reading position of the reading unit and discharging the original conveyed to the reading position wherein a plurality of originals placed on the tray are successively, one by one, conveyed and discharged by the conveying unit; and controlling the reading unit such that (i) the reading unit reads the conveyed originals from a first original to an Nth original of the plurality of originals placed on the tray, where N is a predetermined number, and (ii) the reading unit does not read the conveyed originals from an (N+1)th original to a last original of the plurality of originals placed on the tray.

6. A non-transitory computer-readable storage medium storing a computer program for causing a computer to execute the method for controlling an image forming apparatus according to claim 5.

7. The image forming apparatus according to claim 4, further comprising:
a transmitting unit configured to transmit the image data stored in the storage unit,
wherein the transmitting unit is configured to transmit the image data stored in the storage unit to an external apparatus in a case where a number of originals placed on the tray is N or less, and not transmit the image data stored in the storage unit to the external apparatus in a case where the number of originals placed on the tray is N+1 or more.

8. The image forming apparatus according to claim 7, wherein the transmitting unit transmits the image data stored in the storage unit to the external apparatus via a modem.

9. The image forming apparatus according to claim 1, further comprising:
a transmitting unit configured to transmit the image data read by the reading unit,
wherein the transmitting unit is configured to (i) transmit the image data read by the reading unit to an external apparatus in a case where the number of originals placed on the tray is N or less, and (ii) transmit image data read by the reading unit corresponding to the first original to the Nth original to the external apparatus and not transmit image data corresponding to the (N+1)th original or later, in a case where the number of originals placed on the tray is N+1 or more.

10. The image forming apparatus according to claim 9, further comprising:
a notification unit configured to notify the external apparatus of information indicating that the image data from the (N+1)th original or later were not transmitted.

11. The image forming apparatus according to claim 1, wherein the conveying unit comprises a driving roller configured to convey the original placed on the tray to the reading position of the reading unit and to discharge the original on the reading position.

12. The image forming apparatus according to claim 1, wherein the predetermined number N is a number of sheets that can be successively processed in the image forming apparatus.

13. An image forming apparatus, comprising:
a reading unit configured to read an original;
a conveying unit configured to convey an original placed on a tray to a reading position of the reading unit and to discharge the original conveyed to the reading position, wherein a plurality of originals placed on the tray are successively, one by one, conveyed and discharged by the conveying unit;
a counting unit configured to count a number of originals conveyed by the conveying unit; and
a control unit configured to control the conveying unit and the reading unit such that:
(i) before the number of originals counted by the counting unit reaches a predetermined number, the reading unit reads the conveyed originals conveyed by the conveying unit, and
(ii) after the number of originals counted by the counting unit has reached the predetermined number, the reading unit does not read the conveyed originals conveyed by the conveying unit.

14. The image forming apparatus according to claim 13, further comprising:
an image forming unit configured to form an image on a printing material,
wherein the control unit controls, in a case where the image forming unit executes a copy job forming the image on the printing material using the image data read by the reading unit:
(i) the image forming unit to form the image on the printing material using the image data read, from the original, by the reading unit until the number of originals counted by the counting unit reaches a predetermined number, and
(ii) the reading unit not to read the plurality of originals conveyed by the conveying unit and the image forming unit not to form the image on the printing material after the number of originals counted by the counting unit has reached the predetermined number.

15. The image forming apparatus according to claim 14, further comprising:
a display unit to display a number of originals of which the image is formed by the image forming unit, and a number of originals of which the image is not formed by the image forming unit.

16. The image forming apparatus according to claim 13, further comprising:
a storage unit configured to store image data of the originals read by the reading unit, and
a transmitting unit configured to transmit the image data stored in the storage unit to an external apparatus,
wherein the control unit controls, when executing a batch transmission job in which, after reading of all originals placed on the tray is completed, image data stored in the storage unit is transmitted by the transmitting unit to the external apparatus:
(i) the transmitting unit to transmit, at once, the image data stored in the storage unit in a case where all the originals placed on the tray are conveyed by the conveying unit before the number of originals counted by the counting unit reaches a predetermined number,
(ii) to restrict the transmission of the image data stored in the storage unit by the transmitting unit in a case where the number of originals counted by the counting unit has reached the predetermined number.

17. The image forming apparatus according to claim 16, further comprising:
a display unit configured to display a selection screen for causing an operator to select whether or not the image data stored in the storage unit is transmitted to the external apparatus when the transmission of the image data is restricted,
wherein the control unit controls the transmitting unit to transmit the image data of the original read by the reading unit in a case where the operator has selected that the image data is transmitted to the external apparatus, via the selection screen.

18. The image forming apparatus according to claim 13, further comprising:
a transmitting unit configured to transmit the image data read by the reading unit to an external apparatus,
wherein the control unit controls, when executing an individual transmission job in which each time image data is read from an original by the reading unit, the image data is transmitted to the external apparatus:
  (i) the transmitting unit to transmit the image data read by the reading unit to the external apparatus until the number of originals counted by the counting unit reaches the predetermined number, and
  (ii) the transmitting unit to notify the external apparatus when the number of originals counted by the counting unit has reached the predetermined number.

19. A method for controlling an image forming apparatus, the method comprising:
reading, in a reading unit, an original;
conveying an original placed on a tray to a reading position of the reading unit and discharging the original conveyed to the reading position, wherein a plurality of originals placed on the tray are successively, one by one, conveyed and discharged;
counting, in a counting unit, a number of originals conveyed by the conveying unit; and
controlling, in a control unit, the conveying unit and the reading unit such that:
  (i) before the number of originals counted by the counting unit reaches a predetermined number, the reading unit reads the conveyed originals conveyed by the conveying unit, and
  (ii) after the number of originals counted by the counting unit has reached the predetermined number, the reading unit does not read the conveyed originals conveyed by the conveying unit.

20. The image forming apparatus according to claim 1, wherein the predetermined number N is a number of sheets that can be placed on the tray.

21. The image forming apparatus according to claim 1, wherein the originals from the (N+1)th original to the last original is added in the tray after reading is started.

* * * * *